J. E. AND J. ZIMMERMAN.
HOUSE WATER HEATING ATTACHMENT FOR RANGES.
APPLICATION FILED FEB. 17, 1920.
1,369,598.
Patented Feb. 22, 1921.
3 SHEETS—SHEET 3.
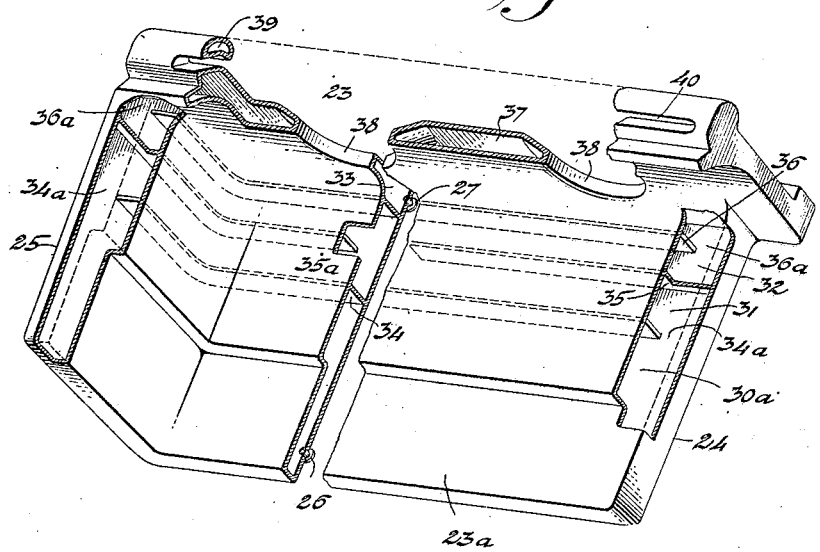
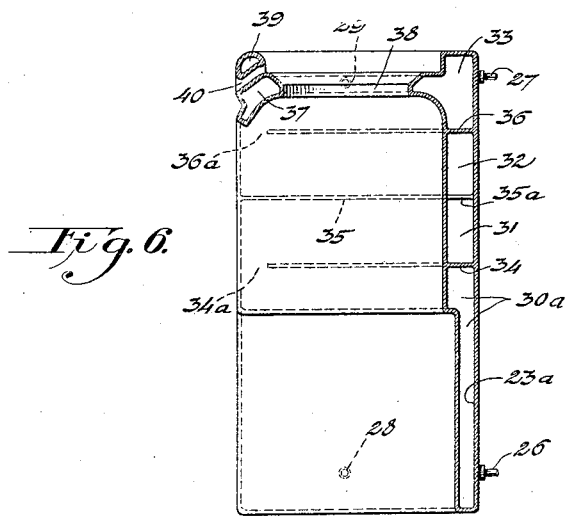
WITNESSES:
INVENTORS:
Joseph E. Zimmerman
and John Zimmerman
BY
ATTORNEYS

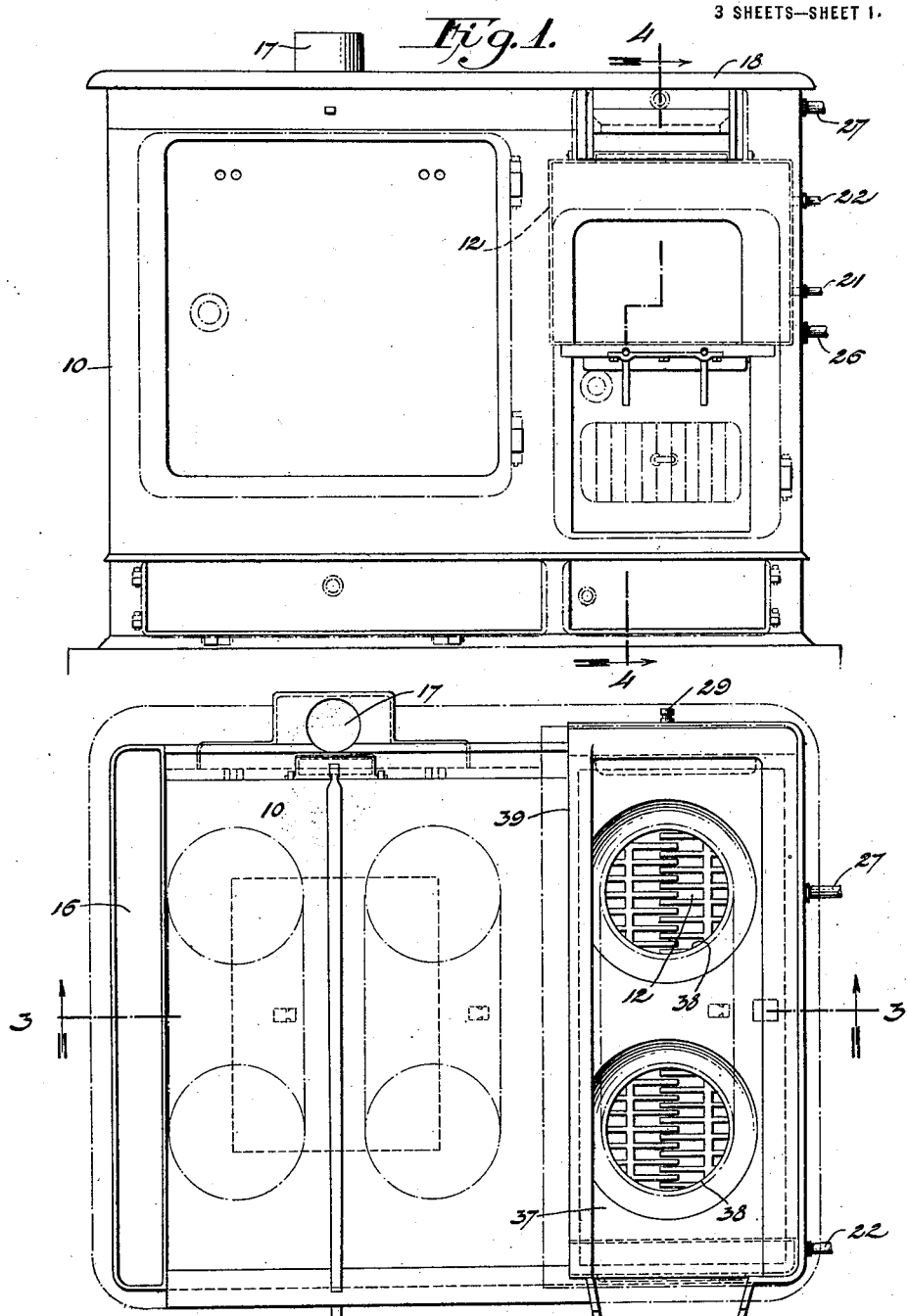

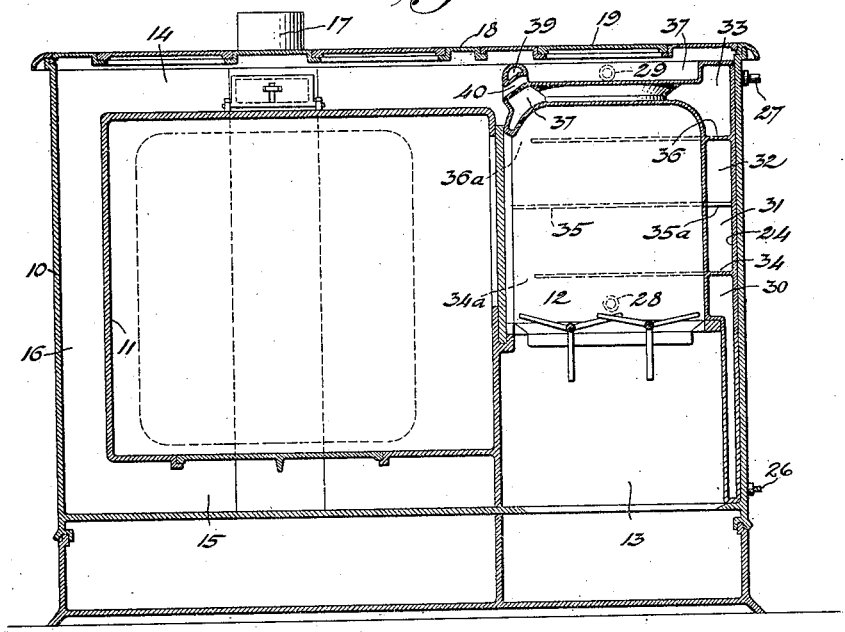

UNITED STATES PATENT OFFICE.

JOSEPH EDWARD ZIMMERMAN, OF NEW YORK, AND JOHN ZIMMERMAN, OF GLENDALE, NEW YORK.

HOUSE WATER-HEATING ATTACHMENT FOR RANGES.

1,369,598.  Specification of Letters Patent.  Patented Feb. 22, 1921.

Application filed February 17, 1920. Serial No. 359,445.

*To all whom it may concern:*

Be it known that we, JOSEPH EDWARD ZIMMERMAN and JOHN ZIMMERMAN, both citizens of the United States, and residents, respectively, of the city of New York, Richmond Hill, and Glendale, borough of Queens, in the county of Queens and State of New York, have invented a new and Improved House Water-Heating Attachment for Ranges, of which the following is a full, clear, and exact description.

This invention relates to cooking range attachments and especially to house water heating appliances such as are covered broadly by Letters Patent of the United States No. 1,294,217, issued to us on the 14th day of February, 1919.

Among the objects of the present invention is to improve the special water back calculated for use in winter or cold weather for heating water as a basis of a circulating system of house heating. We have found in practice that a device, such as indicated, applied to an ordinary cooking range in a dwelling house kitchen is well adapted for heating an apartment or house suitable for an ordinary family. The object of the invention is to adapt a cooking range for ordinary house heating purposes through the instrumentality of a circulating system of water and yet not interfere with the ordinary function of the range for cooking, baking or other purpose such as the heating of the water in the adjacent kitchen boiler.

With the foregoing and other objects in view the invention relates to certain novel features of construction hereinafter more fully set forth and claimed and illustrated in the accompanying drawings, in which—

Figure 1 is a side elevation or general view of a cooking range with our improvement attached thereto.

Fig. 2 is a plan view of the same, but, indicating the top plates removed.

Fig. 3 is a vertical longitudinal section on the line 3—3 of Fig. 2.

Fig. 4 is a vertical transverse section on the line 4—4 of Fig. 1.

Fig. 5 is a detail perspective view of the water back of the circulating system which constitutes the principal part of our present improvement, parts of the same being broken away to show interior construction.

Fig. 6 is a vertical sectional view of the structure shown in Fig. 5.

Referring now more specifically to the drawings, we show our improvement as embodying a kitchen range 10, or its equivalent, having an oven 11, fire box 12, ash receptacle 13, horizontal flue space 14 at the top of the oven, a flue space 15 at the bottom of the oven, a down-draft space 16 leading toward the bottom of the oven, and a flue connection 17 with the use of any approved draft regulator, with which *per se* at this time we are not especially concerned.

The top of the range includes a plurality of detachable plates 18 and lids 19, the removal of which gives access directly to the removable water back features to which our claim is drawn more directly.

As in the previous patent we employ a water back 20 (see Fig. 4) at the front of the fire box having inlet and outlet connections 21 and 22 respectively, for communication with the kitchen boiler, not shown. Extending along the right end of the range and especially along and in intimate association with the fire box 12 and also across the rear end of the fire box at the back of the range is our improved water back 23, comprising an end wing 24 and a rear wing 25 in direct communication with each other, or constituting what may be said to be right angular extensions of each other, said wings being open or hollow with the cavities or chambers therein extending all the way from the front end corner of the fire box along the right end of the range, thence along the rear of the fire box terminating at the rear end corner of the baking oven. We wish to distinctly point out that the water backs 23 may be made any suitable size to conform to our design adapting them to be applied to any suitable make of range either now under construction or to be constructed, and furthermore that the water backs 23 are adapted to be inserted into place lining the two sides of the fire box, or removed therefrom whenever desired and for any purpose, such as inter-change, repair, or for disconnection during the summer season. In some instances the water supply to the delivery pipes may be connected to the right end, or in other installations such pipes may be connected at the rear, consequently we show an alternative connecting means at 26 and 27 for inlet and delivery connections respectively, along the wing 24, and inlet and delivery connections 28 and 29 respectively, along the rear wing 25. Obviously the inlet connection in either adaptation is adjacent to the lower portion of the water back, while the delivery connection is adjacent to the top thereof, whereby the water heated in the back will flow outward and upward along the delivery connection.

The water back 23 is shown as divided substantially into four main horizontal chambers indicated at 30, 31, 32 and 33 respectively, the several chambers being defined by certain partitions extending essentially horizontally along the end and rear wings 24 and 25, but with passageways provided for the circulation of the water upward from any chamber to the next above it. The lowermost chamber 30 is bounded at the top by means of a partition 34 extending practically all the way along the water back, but having its ends terminating short of the ends of the back providing thereby passageways 34$^a$ through which the water may circulate from either end of chamber 30 into the chamber 31. The partition 35, separating the chambers 31 and 32, leads from the ends of the water back, but is interrupted at a point 35$^a$ about midway between the ends of the chamber 31 whence the water heated in the chambers 30 and 31 may pass upward into the chamber 32 along which it may pass in either direction toward the ends of the chamber 32 and whence it will flow upward in turn through the openings 36$^a$ observed at the ends of the partition 36 separating the chambers 32 and 33. Thus the water proceeding into the chamber 33 will be further heated therein and later find its delivery finally through the outlet 27 or 29. It will be noted that the inlet and outlet 26 and 27, which are the preferred ones, together with the partitions and their openings, are so arranged that the maximum degree of heating surface will be afforded for the water passing from the inlet to the outlet. In other words the first partition above the inlet has its delivery into the next upper chamber as far as possible from the inlet, and the next upper partition has its delivery into the next upper chamber as far as possible from the preceding partition passageway.

The upper wing 37 of the water back 23, which extends horizontally across the entire top of the fire box, as well as over the top of the water back 20, is provided with fire holes 38 extending directly through said wing 37 for two important purposes; first, to provide direct heat for cooking purposes directly over the fire box, and secondly, to intensify the heat or add to the surface contact with the water in the water back. To further intensify the heating action on the water we provide a tubular bar 39 extending across the path of heat as it passes along the slot 40 separating the tube or coil 39 from the main portion of the upper wing 37. Except for the heat extracted by the water back in the heating of the water the products of combustion practically all pass upward through the holes 38 and then outward through the slot 40, but since the slot is directed downward somewhat a large portion of the heat is extracted prior to the reaching of the flue 17.

In some instances we find it desirable to extend the pocket of the water back 23 to enlarge its capacity. This may be accomplished in various ways, but as shown we have provided a downwardly projecting flange or auxiliary wing 23$^a$ which extends throughout the full length of the end and rear wings, and constituting a pre-heater for the water circulating through the water back. The inlet 26 or 28 as the case may be, will in this event be transferred to a correspondingly lower position so that the coolest water will be admitted near the bottom edge of the water back in any case. The cavity or space within the extension 23$^a$ is preferably thinner or narrower as shown at 30$^a$ than the remaining chambers, although the outer walls of the extension are preferably flush with the corresponding walls of the wings directly above, whereby the highest heating efficiency and economy of space are realized, but practically all of the other features above enumerated are the same as set forth above.

We claim:

1. The combination with a heating appliance having a fire box and end and rear walls, of a house water heating device comprising a water back including end and rear hollow wings having direct connection with each other, a vertical series of horizontal partitions extending from the inner to the outer walls of said wings, said partitions provided with passage ways for the transfer of water upwardly, said passageways arranged in staggered relation, certain of them being at the ends of partitions, and others being through partitions intermediate their ends, and inlet and outlet connections at the bottom and top respectively, of the end wing.

2. The combination with a heating appliance, including a fire box and an ash pit, of a water back for house water heating purposes including hollow end and rear wings having direct connection with each other, a vertical series of horizontal partitions in the main or body portion of said wings, both wings having a downward extension adapted to extend substantially to the bottom of the ash pit, said extensions of less thickness than the body portion, whereby such extensions constitute a pre-heater for the water.

JOSEPH EDWARD ZIMMERMAN.
JOHN ZIMMERMAN.